United States Patent
He et al.

(10) Patent No.: US 10,922,133 B2
(45) Date of Patent: Feb. 16, 2021

(54) METHOD AND APPARATUS FOR TASK SCHEDULING

(71) Applicant: Alibaba Group Holding Limited, Grand Cayman (KY)

(72) Inventors: Le He, Hangzhou (CN); Yan Huang, Hangzhou (CN); Yingjie Shi, Hangzhou (CN); Jie Zhang, Hangzhou (CN); Chen Zhang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 204 days.

(21) Appl. No.: 16/072,701

(22) PCT Filed: Mar. 16, 2017

(86) PCT No.: PCT/CN2017/076877
§ 371 (c)(1),
(2) Date: Jul. 25, 2018

(87) PCT Pub. No.: WO2017/162086
PCT Pub. Date: Sep. 28, 2017

(65) Prior Publication Data
US 2019/0034228 A1 Jan. 31, 2019

(30) Foreign Application Priority Data
Mar. 25, 2016 (CN) .......................... 201610179807.5

(51) Int. Cl.
*G06F 9/48* (2006.01)
*G06F 9/50* (2006.01)
*H04L 29/08* (2006.01)

(52) U.S. Cl.
CPC .............. *G06F 9/4881* (2013.01); *G06F 9/50* (2013.01); *G06F 9/5033* (2013.01);
(Continued)

(58) Field of Classification Search
CPC ........ G06F 9/4881; G06F 9/50; G06F 9/5033; G06F 9/5072; G06F 2209/486; H04L 67/10
See application file for complete search history.

(56) References Cited

U.S. PATENT DOCUMENTS 6,647,408 B1 11/2003 Ricart et al.
7,356,819 B1 4/2008 Ricart et al.
(Continued)

FOREIGN PATENT DOCUMENTS

| CN | 103377075 A | 10/2013 |
| CN | 104679479 A | 6/2015 |
| CN | 103019853 A | 3/2016 |

OTHER PUBLICATIONS

Isard et al. Quincy: Fair Scheduling for Distributed Computing Clusters. [online] ACM., pp. 261-276. Retrieved From the Internet <https://dl.acm.org/doi/pdf/10.1145/1629575.1629601> (Year: 2009).*
(Continued)

*Primary Examiner* — Emerson C Puente
*Assistant Examiner* — Jonathan R Labud
(74) *Attorney, Agent, or Firm* — James J. DeCarlo; Greenberg Traurig, LLP (57) ABSTRACT

The disclosed embodiments provide a task scheduling method and apparatus. Network resources needed for a task to perform cross-cluster reading and writing are analyzed to obtain usage information of the occupied network resources for reading and writing; and the task is scheduled according to the usage information of the network resources needed for reading and writing. Because the usage information of the network resources occupied for reading and writing respectively represent network resources that can be saved by the cluster where access data is located when the task is scheduled for reading and writing, it can be determined that the cluster to which the task is scheduled can enable the task to
(Continued)

occupy less network resources, thereby solving the problem of high bandwidth usage across clusters in current systems.

18 Claims, 4 Drawing Sheets

(52) U.S. Cl.
CPC ............ *G06F 9/5072* (2013.01); *H04L 67/10* (2013.01); *G06F 2209/486* (2013.01)

(56) References Cited

U.S. PATENT DOCUMENTS

| | | | |
|---|---|---|---|
| 7,490,220 | B2 | 2/2009 | Balasubramonian et al. |
| 7,861,246 | B2 | 12/2010 | Lu et al. |
| 7,934,199 | B2 | 4/2011 | Jostmeyer et al. |
| 8,082,362 | B1 | 12/2011 | Ewing |
| 8,533,729 | B2 | 9/2013 | Yao |
| 8,874,505 | B2 * | 10/2014 | Lin ..................... G06F 11/2094 707/609 |
| 9,239,994 | B2 | 1/2016 | Wolfe et al. |
| 9,977,699 | B2 | 5/2018 | Chen et al. |
| 2005/0131900 | A1 | 6/2005 | Sudarshan et al. |
| 2005/0283782 | A1 | 12/2005 | Lu et al. |
| 2006/0004796 | A1 * | 1/2006 | Nakamura .............. G06F 3/061 |
| 2006/0184941 | A1 | 8/2006 | Urhan |
| 2008/0126793 | A1 | 5/2008 | Jostmeyer et al. |
| 2009/0193427 | A1 | 7/2009 | Pu et al. |
| 2009/0319608 | A1 | 12/2009 | Anil et al. |
| 2016/0139964 | A1 | 5/2016 | Chen et al. |
| 2016/0292608 | A1 | 10/2016 | Yin et al. |

OTHER PUBLICATIONS

Chang et al., "Job scheduling and data replication on data grids," Future Generations Computer Systems, Elsevier Science Publishers, vol. 23, No. 7, pp. 846-860 (2007).
Extended European Search Report to corresponding EP Application No. 17769363.7 dated Sep. 3, 2019 (10 pages).
Chang et al, "Job scheduling and data replication on data grids," Science Direct, pp. 846-860 (2007).
Official Action to corresponding CN Application No. 2020011502098680 dated Jan. 19, 2020 (9 pages).
International Search Report to corresponding International Application No. PCT/CN2017/076877 dated Jun. 22, 2017 (1 page).

* cited by examiner

METHOD AND APPARATUS FOR TASK SCHEDULING

CROSS-REFERENCE TO RELATED APPLICATIONS

This application claims priority to Chinese Patent Application No. 201610179807.5, filed on 25 Mar. 2016 and titled "TASK SCHEDULING METHOD AND APPARATUS" and Int'l Appl. No. PCT/CN2017/076877 filed on Mar. 16, 2017, both of which are incorporated by reference in their entirety.

BACKGROUND

Technical Field

The disclosed embodiments relate to computer technology, and in particular, to task scheduling methods and apparatuses.

Description of the Related Art

To improve the stability of a system as well as data processing capabilities and service capabilities of a network center, clustering technology is often used. Clustering technology can connect servers to form a cluster. Multiple clusters are connected to one another to form a distributed system. Each cluster in the distributed system runs a series of common applications.

In the distributed system, the running applications can be divided into multiple tasks. For individual tasks, they can be assigned to different service units according to the service types they are running. That is, tasks in the same service unit are run on the same cluster, and task data of these tasks can also be stored on the cluster.

One task in one service unit may need to read task data of another task in another service unit. That is, a task running on an original cluster needs to depend on task data of another task. As a result, when the task and the task data of another task that it depends on, i.e., dependent data, are on different clusters, the task will read and write across clusters, and a large amount of bandwidth is then occupied. Once a situation where a certain task is found to read and write across clusters is identified, current systems schedule a task to a target cluster where the dependent data read by the task locates. However, in actual operation, occupied bandwidth across clusters may still be very large.

SUMMARY

The disclosed embodiments provide task scheduling methods and apparatuses to solve the problem of high bandwidth usage across clusters in current systems. To achieve the objective set out above, disclosed embodiments provide the following technical solutions.

In a first embodiment, a task scheduling method is provided and comprises: analyzing network resources needed for a task to perform cross-cluster reading and writing to obtain usage information of the network resources needed for the task to perform the cross-cluster reading and writing; and scheduling the task according to the usage information of the network resources needed for reading and writing.

In a second embodiment, a task scheduling apparatus is provided and comprises: an analysis module, configured to analyze network resources needed for a task to perform cross-cluster reading and writing to obtain usage information of the network resources needed for the task to perform the cross-cluster reading and writing; and a scheduling module, configured to schedule the task according to the usage information of the network resources needed for reading and writing.

The task scheduling methods and apparatuses provided in disclosed embodiments analyze network resources needed for a task to perform cross-cluster reading and writing to obtain usage information of the network resources needed for the task to perform the cross-cluster reading and writing; and schedule the task according to the usage information of the network resources needed for reading and writing. Because the usage information of the network resources occupied for reading and writing respectively represent network resources that can be saved by the cluster where access data is located when the task is scheduled for reading and writing, it can be determined that the cluster to which the task is scheduled can enable the task to occupy less network resources, thereby solving the problem of high bandwidth usage across clusters in current systems.

The above description is merely an overview of the technical solutions of the disclosure. For those skilled in the art to better understand the technical means of the disclosed embodiments so that the technical solutions may be implemented more clearly and easily, the above description, other objectives, features, and advantages of the disclosed embodiments are illustrated in the following content of the specification. The embodiments of the disclosure are specifically described in what follows.

BRIEF DESCRIPTION OF THE DRAWINGS

Other advantages and benefits will become evident to a person skilled in the art by reading the following detailed description of the embodiments. The accompanying drawings are to illustrate the embodiments only and are not to be considered to limit the disclosed embodiments. Moreover, in the accompanying drawings, same reference symbols are used to represent the same parts.

DETAILED DESCRIPTION OF THE EMBODIMENTS

Exemplary embodiments will be described below in more detail with reference to the accompanying drawings. Although the accompanying drawings show exemplary embodiments of the present disclosure, it should be understood that the disclosure may be implemented in various forms and should not be limited by the embodiments described herein. Instead, these embodiments are provided so that the disclosure will be better understood, and the scope of the disclosure can be fully conveyed to a person skilled in the art.

The task scheduling method and apparatus provided by the disclosed embodiments are described in detail below with reference to the accompanying drawings.

Figure 1:
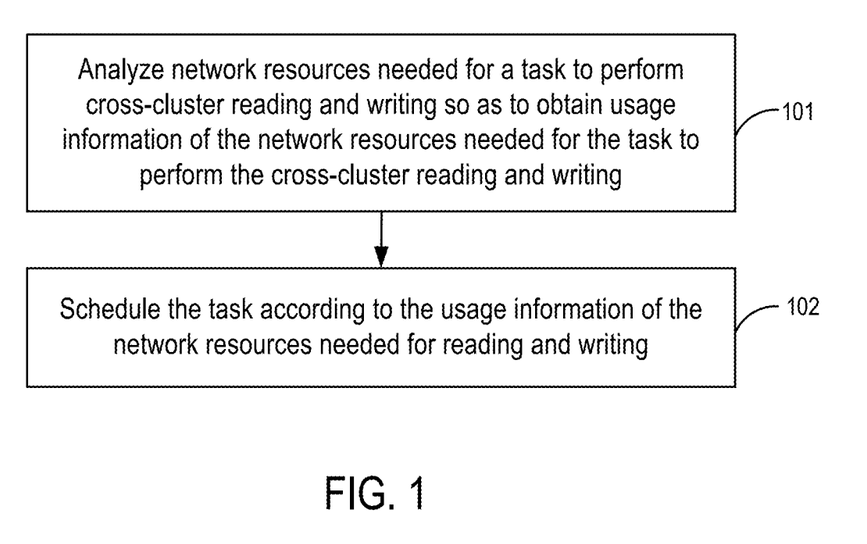
FIG. 1 is a flow diagram of a task scheduling method according to some embodiments of the disclosure.

FIG. 1 is a flow diagram of a task scheduling method according to some embodiments of the disclosure. The method provided by this embodiment may be performed by a task management device in a distributed system as shown in FIG. 1. In the illustrated embodiment, the method includes the following steps.

Step 101: Analyze network resources needed for a task to perform cross-cluster reading and writing to obtain usage information of the network resources needed for the task to perform the cross-cluster reading and writing.

Specifically, a distributed system generally carries many tasks, and most of them are periodic tasks. These tasks may run on an hourly, daily, or weekly basis. Before the task runs, it needs to access (i.e., read) the data required for the operation. The data periodically accessed by the task is the latest data at the time, which ensures the accuracy of the result data obtained through the operation. After reading the data, the read data needs to be inputted into the running task. Therefore the read data serves as the input data for the task. If the task performs cross-cluster reading in the process of accessing the data, it will occupy certain network resources such as the bandwidth. In the case of accessing data across clusters, it must involve reading data from a cluster to the cluster on which the task is running. Therefore, in such cases, the input data of the task can indicate the usage information of network resources occupied for cross-cluster reading, such as the usage information of the occupied bandwidth.

Also, after the task is run and completed, the result data of the task needs to be returned to a default cluster originally assigned by the task management device. The returned result data needs to be outputted first by the task, and the output data is called output data of the task. Then, the result data is written to the default cluster. If the task performs cross-cluster writing in the process of returning the result data, it will also occupy certain network resources such as the bandwidth. Returning the result data across clusters must involve writing data from the cluster on which the task is running to another cluster. Therefore, in such cases, the output data of the task can indicate the usage information of network resources occupied for cross-cluster writing, such as the usage information of the occupied bandwidth.

By using the usage information of network resources needed for a task to perform cross-cluster reading and writing, on the one hand, it is possible to predict the usage information of the network resources occupied by the task when the original cluster where the task currently locates and a cluster where the read dependent data is located are different clusters. On the other hand, it is also possible to predict the usage information of the network resources occupied by the task when the original cluster where the task currently locates and the cluster where the written result data is located are different clusters.

As a possible implementation, the amount of data inputted and outputted by each task running on the currently allocated original cluster is recorded in a history record. According to the history record, an amount of input data and an amount of output data for each task can be obtained, and an input-output ratio is calculated for each task. The input-output ratio is equal to a ratio of the amount of input data to the amount of output data.

Step 102: Schedule the task according to the usage information of the network resources needed for reading and writing.

Specifically, if network resources needed for reading are more than network resources needed for writing, the task is scheduled to a target cluster where the read dependent data is located.

This is because data storage and task running for cross-cluster tasks are located on different clusters. Three scenarios of how the input data and the output data are stored are respectively described as follows:

A. The data is stored on the original cluster currently assigned by the task.

B. The data is stored on the target cluster to which the task is to be scheduled.

C. The data is stored on the cluster other than the original cluster and the target cluster.

Therefore, in current systems, where once a situation where a certain task is found to read and write across clusters is identified, a task is scheduled to a target cluster where the dependent data read by the task is located, as long as input data or output data is not on the target cluster, the cluster needs to be accessed through cross-cluster replication or read through/write through. When cross-cluster data generated by cross-cluster tasks is too large, it puts pressure on the network resources.

A possible scenario is as follows: if the input data of the cluster tasks is stored on the target cluster and the amount of the data is large, then scheduling the cross-cluster task to the target cluster may save network resources occupied for reading the dependent data from the target cluster to the original cluster, and the amount of the output data for the task is small, so the increase in the network resources occupied for writing the result data from the target cluster to the default cluster caused by scheduling the cross-cluster task to the target cluster is not large, so that the occupied network resource across clusters caused by scheduling is significantly reduced. In other words, the larger the ratio of the amount of the input data to the amount of the output data (i.e., the input/output ratio) the more significant it will be in reducing the occupied network resource across the clusters.

As a possible implementation, by determining whether the input/output ratio for the task is greater than a preset first threshold, it can be predicted whether the scheduling to the target cluster where the dependent data is located can effectively reduce occupied network resources such as the bandwidth. If so, the task is scheduled to the target cluster where the dependent data for the task locates. The first threshold is greater than one.

On the other hand, if network resources needed for reading are not more than network resources needed for writing, the task is scheduled to a target cluster where the written result data is located.

In this embodiment, network resources needed for a task to perform cross-cluster reading and writing are analyzed to obtain usage information of the occupied network resources for reading and writing; and the task is scheduled according to the usage information of the network resources needed for reading and writing. Because the usage information of the network resources occupied for reading and writing respectively represent network resources that can be saved by the cluster where access data is located when the task is scheduled for reading and writing, it can be determined that the cluster to which the task is scheduled can enable the task to occupy fewer network resources, thereby solving the problem of high bandwidth usage across clusters in current systems.

Figure 2:
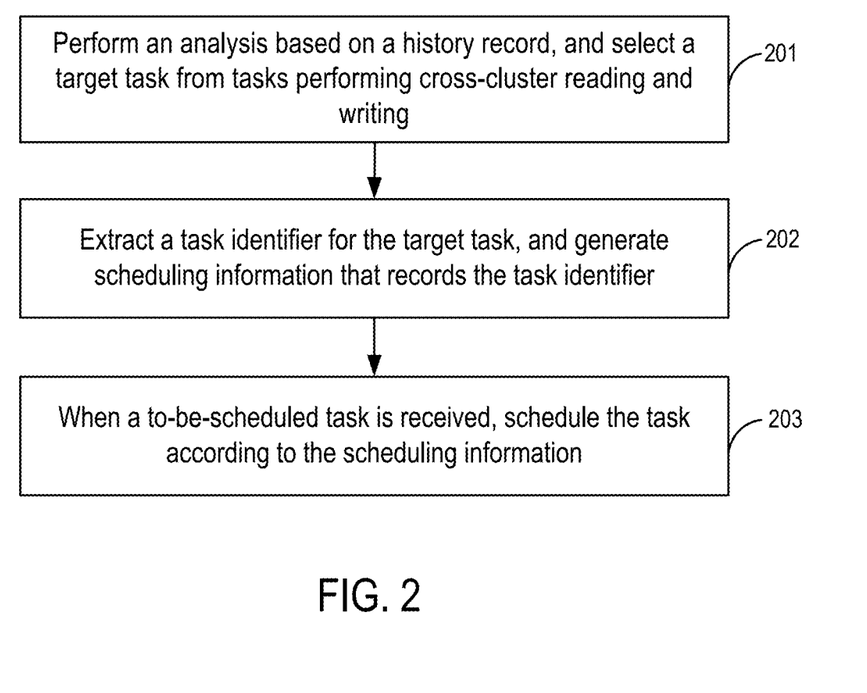
FIG. 2 is a flow diagram of a task scheduling method according to some embodiments of the disclosure.

FIG. 2 is a flow diagram of a task scheduling method according to some embodiments of the disclosure. As shown in FIG. 2, the method includes the following steps.

Step 201: Perform an analysis based on a history record and select a target task from tasks performing cross-cluster reading and writing.

Specifically, task information and data information of each task is recorded in a history record. The task information includes an amount of input data and an amount of output data. The data information includes a cluster where the input data is located; a cluster where the output data is located; a service unit to which the task belongs; a cluster where the task locates currently; operating frequency, and operating overhead.

Based on the history record, it is then determined that it is a cross-cluster task if the cluster where the input data or output data is located is different from the current cluster where the task locates. The cluster where the task locates currently is used as an original cluster.

For each cross-cluster task, the input-output ratio is calculated according to the following formula: the input-output ratio=the amount of input data/the amount of output data. The selection criteria, which consists of the input-output ratio, the amount of output data, the operation overhead, the operation frequency, and the load of the cluster where the current task locates, is used to select the target task needing more network resources in the reading operation than in the writing operation.

For example, the selection criteria may be that the input-output ratio is greater than a first threshold; and the first threshold is 100; the amount of output data is less than 100 GB; and the operation overhead, the operation frequency, and the cluster load are respectively less than the preset cluster quota.

The preset cluster quota is determined based on the cluster resources such as the CPU and storage space that the target cluster can provide. Adding into the selection criteria the indicators such as the operation overhead, the operation frequency, and the cluster load for indicating the cluster resources occupied by the task is to resolve the problem described below. When the input and output are relatively large, i.e., the network resources saved by the scheduling task are relatively large, the task occupies a relatively large amount of cluster resources when it is running. As a result, the target clusters where the task is scheduled to cannot meet the needs, which greatly increases the load of the target cluster. In a case like this, scheduling the task to the target cluster does not significantly improve the overall performance of the distributed system. The cost of scheduling, in this case, outweighs the benefits. Therefore, when a running task occupies a relatively large amount of cluster resources, the task is not scheduled.

Step 202: Extract a task identifier for the target task and generate scheduling information that records the task identifier.

Specifically, two methods for obtaining the task tag for the target task are used. For a Structured Query Language (SQL) task, the periodical attribute in the query statement can be masked out, and hash digest processing is performed on the task, for example, the Message Digest 5 (MD5) algorithm is used to perform the hash digest processing and the hash digest is used as the task identifier for the task. In another method, for a non-SQL task, the fixed number of the task may be directly used as the task identifier for the task. These fixed numbers may come from external systems such as the Skynet system.

In the scheduling information, a task identifier is used to mark the target task. In addition, the scheduling information can be used to record the target cluster to which the target task needs to be scheduled.

Due to a large amount of computation in the analysis process of selecting the target task based on the historical record, the selection can be executed in advance, to generate scheduling information based on the execution results. In this way, when to-be-scheduled tasks are received, scheduling may be directly performed according to the scheduling information obtained in the pre-analysis without analyzing the tasks, which saves time and increases timeliness of scheduling. In the actual operation, the process of analyzing based on the history record and generating scheduling information may be referred to as a training process; and the subsequent process of scheduling based on the scheduling information may be referred to as a decision process.

Step 203: When a to-be-scheduled task is received, schedule the task according to the scheduling information.

Specifically, when the to-be-scheduled task is received, the task identifier for the task is obtained to identify the task. Specifically, after a task scheduling system receives the to-be-scheduled task, the task scheduling system determines whether the task type is SQL. If so, a hash digest is extracted and used as the task identifier; otherwise, a fixed number is extracted and used as the task identifier. Specific details regarding the process of obtaining the task identifier can be seen in the relevant description of step 202, which will not be repeated herein but is incorporated herein by reference in its entirety. According to the obtained task identifier, a matching process is performed for the scheduling information; if a match is found, the task is scheduled to the target cluster; otherwise, the task is scheduled to the original cluster where the result data written by the task locates. Further, after the scheduling, computing resources can be allocated to the scheduled tasks.

When the input data of the cluster tasks is stored on the target cluster and the amount of the data is large, scheduling the cross-cluster task to the target cluster may save network resources occupied for reading the dependent data from the target cluster to the original cluster; and the amount of the output data for the task is small, so the increase in the network resources occupied for writing the result data from the target cluster to the original cluster caused by scheduling the cross-cluster task to the target cluster is not large, so that the occupied network resource across clusters caused by scheduling is significantly reduced.

In other words, the larger the ratio of the amount of the input data to the amount of the output data, i.e., the input/output ratio, the more significant it will be in reducing the occupied network resource across the clusters. The value of the first threshold can be determined accordingly. If the task is scheduled to the target cluster only when the reducing of the occupied network resource across the clusters is significant, the first threshold can be determined to be a large value; otherwise, the first threshold can be determined to be a small value. Nevertheless, the first threshold should be greater than one.

Figure 3:
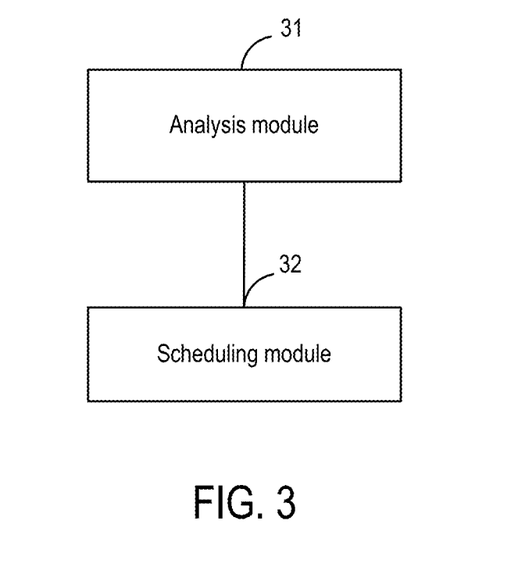
FIG. 3 is a block diagram of a task scheduling apparatus according to some embodiments of the disclosure.

FIG. 3 is a block diagram of a task scheduling apparatus according to some embodiments of the disclosure. As shown in FIG. 3, and the apparatus includes an analysis module 31 and a scheduling module 32.

The analysis module 31 is configured to analyze network resources needed for a task to perform cross-cluster reading and writing to obtain usage information of the network resources needed for the task to read and write.

The scheduling module 32 is configured to schedule the task according to the usage information of the network resources needed for reading and writing.

The scheduling module 32 is specifically configured to schedule, if network resources needed for reading are more than network resources needed for writing, the task to a target cluster where the read dependent data is located.

In this embodiment, network resources needed for a task to perform cross-cluster reading and writing are analyzed to obtain usage information of the occupied network resources for reading and writing; and the task is scheduled according to the usage information of the network resources needed for reading and writing. Because the usage information of the network resources occupied for reading and writing respectively represent network resources that can be saved by the cluster where access data is located when the task is scheduled for reading and writing, it can be determined that the cluster to which the task is scheduled can enable the task to occupy less network resources, thereby solving the problem of high bandwidth usage across clusters in current systems.

Figure 4:
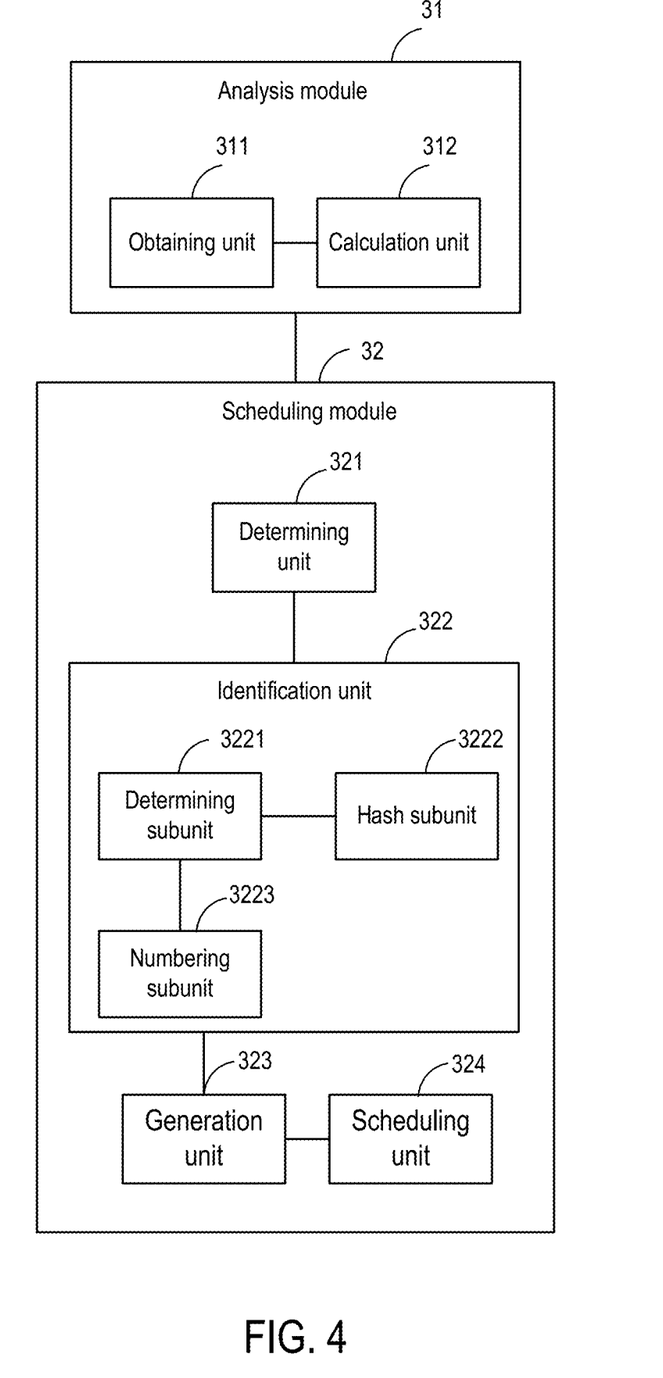
FIG. 4 is a block diagram of a task scheduling apparatus according to some embodiments of the disclosure.

FIG. 4 is a block diagram of a task scheduling apparatus according to some embodiments of the disclosure. Based on the task scheduling apparatus provided in FIG. 3, the analysis module 31 includes an obtaining unit 311 and a calculation unit 312.

The obtaining unit 311 is configured to obtain, according to a history record, an amount of input data and an amount of output data for each task.

The calculation unit 312 is configured to calculate an input-output ratio for indicating a proportion of the network resources needed for reading and writing for each task.

The input-output ratio is equal to a ratio of the amount of input data to the amount of output data.

Further, a scheduling module 32 includes a determining unit 321, an identification unit 322, a generation unit 323, and a scheduling unit 324.

The determining unit 321 is configured to determine whether the task meets a preset selection criteria.

The selection criteria includes that the input-output ratio is greater than a preset first threshold, wherein the first threshold is greater than 1. The selection criteria further includes that the amount of output data is smaller than a second threshold, and/or occupied cluster resources are smaller than a preset quota. The occupied cluster resources comprise at least one of operating overhead, operating frequency, and cluster load.

The identification unit 322 is configured to obtain a task identifier for a task meeting the selection criteria.

The generation unit 323 is configured to generate scheduling information for recording the task identifier.

The scheduling unit 324 is configured to schedule, if the task meets the selection criteria, the task to the target cluster where the dependent data read by the task locates.

Specifically, the scheduling unit 324 is configured to obtain the task identifier for the to-be-scheduled task obtained by the identification unit when receiving the to-be-scheduled task; and schedule the to-be-scheduled task to a target cluster where dependent data for the to-be-scheduled task locates if the task identifier of the to-be-scheduled task matches the task identifier in the scheduling information.

Further, the identification unit 322 includes a determining subunit 3221, a hash subunit 3222, and a numbering subunit 3223.

The determining subunit 3221 is configured to determine whether a type of the task is SQL.

The hash subunit 3222 is configured to perform hash processing on the task to obtain a hash digest if the task type is SQL, and use the hash digest as the task identifier.

The numbering subunit 3223 is configured to use a number of the task as the task identifier when the task type is not SQL.

It should be noted that the network resources mentioned above can be network bandwidths and/or network bandwidth delay products. A person skilled in the art can know that other indicators for balancing network resources can be used without affecting implementation effects of the embodiments.

Network resources needed for a task to perform cross-cluster reading and writing are analyzed to obtain usage information of the occupied network resources for reading and writing; and the task is scheduled according to the usage information of the network resources needed for reading and writing. Because the usage information of the network resources occupied for reading and writing respectively represent network resources that can be saved by the cluster where access data is located when the task is scheduled for reading and writing, it can be determined that the cluster to which the task is scheduled can enable the task to occupy less network resources, thereby solving the problem of high bandwidth usage across clusters in current systems.

Those skilled in the art can understand that all or part of the steps for implementing the method in above embodiments can be accomplished by hardware related to program instructions. The aforementioned program may be stored in a computer-readable storage medium. In execution, a processor executes the steps of the method in the above embodiments, and the foregoing storage medium includes various medium that can store program instructions, such as a ROM, a RAM, a magnetic disk, or an optical disc.

It should be finally noted that the above embodiments are merely used for illustrating rather than limiting the technical solutions of the disclosed embodiments. Although the disclosure is described in detail with reference to the foregoing embodiments, those of ordinary skill in the art should understand that the technical solutions recorded in the foregoing embodiments may still be modified or equivalent replacement may be made on part or all of the technical features therein. These modifications or replacements will not make the essence of the corresponding technical solutions be departed from the scope of the technical solutions in the disclosed embodiments.

What is claimed is:

1. A method comprising:
obtaining, by a task management device of a distributed system, network resources needed to perform cross-cluster reading and writing, the network resources associated with a task and comprising an amount of input data and an amount of output data for the task based on a history record of past executions of the task;
analyzing, by the task management device of the distributed system, the network resources by calculating an input-output ratio representing a proportion of the network resources needed for reading and writing for the task, the input-output ratio equal to a ratio of the amount of input data to the amount of output data; and
scheduling, by the task management device, the task according to the network resources.

2. The method of claim 1, the scheduling the task comprising scheduling the task to a target cluster where read dependent data is located if the network resources needed for reading are more than network resources needed for writing.

3. The method of claim 1, the scheduling the task further comprising:
determining whether the task meets a preset selection criteria, the preset selection criteria comprising that the input-output ratio is greater than a preset first threshold, the preset first threshold greater than one; and
scheduling the task to a target cluster where the dependent data read by the task locates.

4. The method of claim 3, further comprising:
obtaining, by the task management device, a task identifier for a task meeting the selection criteria; and generating, by the task management device, scheduling information that includes the task identifier.

5. The method of claim 4, the scheduling the task to a target cluster where the dependent data read by the task locates comprising:
obtaining the task identifier for the task when the task is received; and
scheduling the task to a target cluster where dependent data for the task locates if the task identifier of the task matches the task identifier in the scheduling information.

6. The method of claim 4, the obtaining a task identifier comprising:
determining whether a type of the task is Structured Query Language (SQL);
performing hash processing on the task to obtain a hash digest if the task type is SQL, and using the hash digest as the task identifier; and
using a number of the task as the task identifier if the task type is not SQL.

7. The method of claim 3, the selection criteria comprising one or more of:
an amount of output data being smaller than a second threshold; and
occupied cluster resources being less than a preset quota, the occupied cluster resources comprising at least one of operating overhead, operating frequency, and cluster load.

8. The method of claim 1, the network resources comprising at least one of a network bandwidth and a network bandwidth-delay product.

9. The method of claim 1, further comprising determining, by the task management device, that the task is a cross-cluster task by determining, based on the history record, if the input or output data of the task is located in a cluster different from a current cluster of the task.

10. An apparatus comprising:
a processor; and
a storage medium for tangibly storing thereon program logic for execution by the processor, the stored program logic comprising:
logic, executed by the processor, for obtaining network resources needed to perform cross-cluster reading and writing, the network resources associated with a task and comprising an amount of input data and an amount of output data for the task based on a history record of past executions of the task;
logic, executed by the processor, for analyzing the network resources calculating an input-output ratio representing a proportion of the network resources needed for reading and writing for the task, the input-output ratio equal to a ratio of the amount of input data to the amount of output data; and
logic, executed by the processor, for scheduling the task according to the network resources.

11. The apparatus of claim 10, the logic for scheduling the task comprising logic, executed by the processor, for scheduling the task to a target cluster where read dependent data is located if the network resources needed for reading are more than network resources needed for writing.

12. The apparatus of claim 10, the logic for scheduling the task further comprising:
logic, executed by the processor, for determining whether the task meets a preset selection criteria, the preset selection criteria comprising that the input-output ratio is greater than a preset first threshold, the preset first threshold greater than one; and
logic, executed by the processor, for scheduling the task to a target cluster where the dependent data read by the task locates.

13. The apparatus of claim 12, the stored program logic further comprising:
logic, executed by the processor, for obtaining a task identifier for a task meeting the selection criteria; and
logic, executed by the processor, for generating scheduling information that includes the task identifier.

14. The apparatus of claim 13, the logic for scheduling the task to a target cluster where the dependent data read by the task locates comprising:
logic, executed by the processor, for obtaining the task identifier for the task when the task is received; and
logic, executed by the processor, for scheduling the task to a target cluster where dependent data for the task locates if the task identifier of the task matches the task identifier in the scheduling information.

15. The apparatus of claim 13, the logic for obtaining a task identifier comprising:
logic, executed by the processor, for determining whether a type of the task is Structured Query Language (SQL);
logic, executed by the processor, for performing hash processing on the task to obtain a hash digest if the task type is SQL, and using the hash digest as the task identifier; and
logic, executed by the processor, for using a number of the task as the task identifier if the task type is not SQL.

16. The apparatus of claim 12, the selection criteria comprising one or more of:
an amount of output data being smaller than a second threshold; and
occupied cluster resources being less than a preset quota, the occupied cluster resources comprising at least one of operating overhead, operating frequency, and cluster load.

17. The apparatus of claim 10, the network resources comprising at least one of a network bandwidth and a network bandwidth-delay product.

18. The apparatus of claim 10, the stored program logic further comprising logic, executed by the processor, for determining that the task is a cross-cluster task by determining, based on the history record, if the input or output data of the task is located in a cluster different from a current cluster of the task.

* * * * *